(12) United States Patent
Drude (10) Patent No.: US 8,180,298 B2
(45) Date of Patent: May 15, 2012

(54) METHOD AND APPARATUS TO MINIMIZE INTERFERENCE AMONG CO-LOCATED MULTIPLE WIRELESS DEVICES

(75) Inventor: Stefan Drude, Waalre (NL)

(73) Assignee: NXP B.V., Eindhoven (NL)

( * ) Notice: Subject to any disclaimer, the term of this patent is extended or adjusted under 35 U.S.C. 154(b) by 823 days.

(21) Appl. No.: 11/814,560

(22) PCT Filed: Jan. 16, 2006

(86) PCT No.: PCT/IB2006/050153
§ 371 (c)(1),
(2), (4) Date: May 12, 2008

(87) PCT Pub. No.: WO2006/077524
PCT Pub. Date: Jul. 27, 2006

(65) Prior Publication Data
US 2008/0274707 A1 Nov. 6, 2008

Related U.S. Application Data

(60) Provisional application No. 60/646,092, filed on Jan. 21, 2005.

(51) Int. Cl.
*H04W 88/06* (2009.01)
*H04B 1/00* (2006.01)
(52) U.S. Cl. .................... 455/63.1; 455/41.2

(58) Field of Classification Search .......... 455/63.1
See application file for complete search history.

(56) References Cited

U.S. PATENT DOCUMENTS

| 4,479,211 | A | * | 10/1984 | Bass et al. | 370/261 |
|---|---|---|---|---|---|
| 4,736,366 | A | * | 4/1988 | Rickard | 370/439 |
| 5,463,629 | A | * | 10/1995 | Ko | 370/463 |
| 5,930,256 | A | * | 7/1999 | Greene et al. | 370/397 |
| 6,539,204 | B1 | | 3/2003 | Marsh et al. | |
| 6,600,726 | B1 | | 7/2003 | Nevo et al. | |
| 2004/0259589 | A1 | | 12/2004 | Bahl et al. | |
| 2006/0002481 | A1 | * | 1/2006 | Partiwala et al. | 375/253 |
| 2006/0133307 | A1 | * | 6/2006 | Fukasawa et al. | 370/328 |

FOREIGN PATENT DOCUMENTS
EP 1119137 A1 7/2001
* cited by examiner

*Primary Examiner* — Temesgh Ghebretinsae
*Assistant Examiner* — Gennadiy Tsvey (57) ABSTRACT

Disclosed is a method and apparatus for managing transmit requests among a plurality of co-located transmitting devices each associated with a wireless transmitting protocol. The method comprises the steps of determining the cost associated with each of the transmit requests, wherein the cost is associated with the cost of granting the request and the cost of rejecting the request, granting the request associated with the lowest cost, and rejecting all other requests. In another aspect of the invention, the method comprises the step of determining whether the lowest cost is acceptable and rejecting the request associated with the lowest cost when the lowest cost is unacceptable.

20 Claims, 12 Drawing Sheets

| | STATE 1 | STATE 2 | STATE 3 | ... | STATE M |
|---|---|---|---|---|---|
| EVENT 1 | • NEXT STATE | • NEXT STATE | • NEXT STATE | ... | • NEXT STATE |
| EVENT 2 | • NEXT STATE | • NEXT STATE | • NEXT STATE | ... | • NEXT STATE |
| EVENT 3 | • NEXT STATE | • NEXT STATE | • NEXT STATE | ... | • NEXT STATE |
| EVENT 4 | • NEXT STATE | • NEXT STATE | • NEXT STATE | ... | • NEXT STATE |
| ⋮ | | | | ⋮ | |
| EVENT K | • NEXT STATE | • NEXT STATE | • NEXT STATE | ... | • NEXT STATE |
| OTHER SYSTEM TRANSMIT | • NEXT STATE<br>• TRANSITION COST | • NEXT STATE<br>• TRANSITION COST | • NEXT STATE<br>• TRANSITION COST | ... | • NEXT STATE<br>• TRANSITION COST |

METHOD AND APPARATUS TO MINIMIZE INTERFERENCE AMONG CO-LOCATED MULTIPLE WIRELESS DEVICES

This application is related to the field of wireless communications and, more particularly, to a method and apparatus for minimizing interference among multiple wireless systems contained in a device.

More and more portable consumer electronic devices include a wireless communication technology instead of wired communications. With the increasing trend towards replacing wired communications by wireless communications, many devices include more than one wireless communication sub-system in the same physical implementation (housing), and these communication sub-systems may need to be active and operational at the same time. This gives rise to the problem of mutual interference between these communication sub-systems. A typical example is a mobile phone, where, for example, Bluetooth technology is used to connect wireless headsets to the phone while an actual cellular communication is taking place at the same time. Similarly, a portable computer or PDA (person digital assistant) may include Bluetooth and wireless LAN technology, e.g., IEEE 802.11, which will need to be active at the same time. In this case interference is particularly bad because the two systems operate in the same frequency band.

Causes of such interference are well known. For example, in one case, the signals of active local transmitters can be received by other local receivers. In a second case, interference may occur through coupling between common power-supply lines, or circuit tracks or substrate currents. Interference may also be caused by intermodulation products, if more than one transmitter is active concurrently.

Hence, there is a need in the industry for a method and apparatus to coordinate the activity of multiple wireless communication standards within a device to minimize interference and loss of bandwidth.

A method and apparatus for managing transmit requests among a plurality of co-located transmitting devices each associated with a wireless transmitting protocol is disclosed. The method comprising the steps of determining the cost associated with each of the transmit requests, wherein the cost is associated with the cost of granting the request and the cost of rejecting the request, granting the request associated with the lowest cost, and rejecting all other requests. In another aspect of the invention, the method comprises the step of determining whether the lowest cost is acceptable and rejecting the request associated with the lowest cost, when the lowest cost is unacceptable.

It is to be understood that these drawings are solely for the purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

Figure 1:
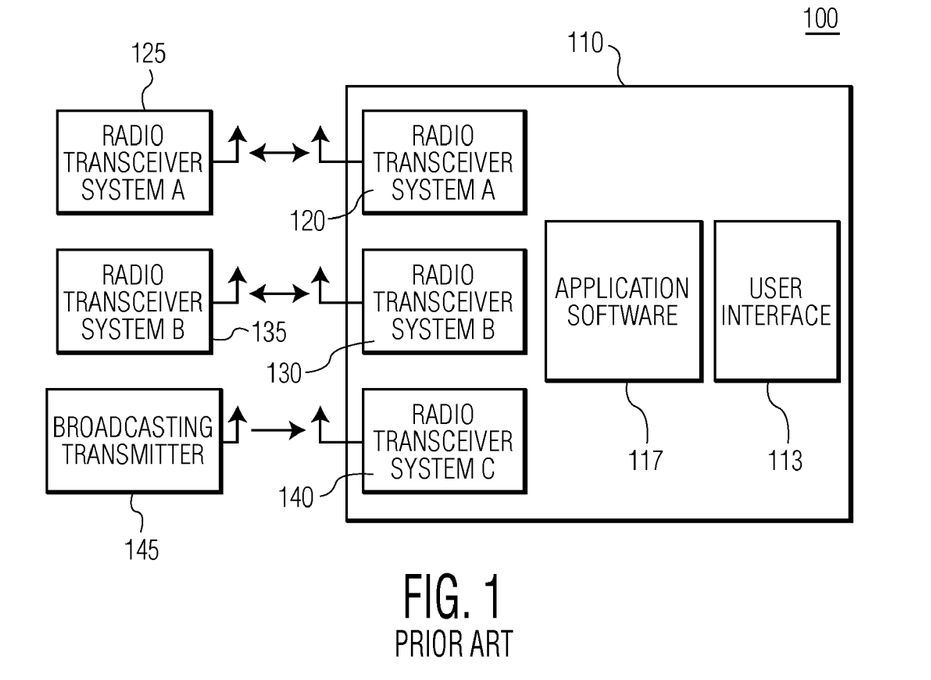
FIG. 1 illustrates a block diagram of a conventional multi-wireless sub-system apparatus.

FIG. 1 illustrates a block diagram of a conventional multi-wireless sub-system 100. In this exemplary block diagram, apparatus 110 includes a user interface 113, application software 117 and radio transceiver systems 120, 130, referred to as system A, and B, respectively, and receiving system 140, referred to as C. Transceiver systems 120 and 130 each transmit and receive, through a wireless network, information items to/from corresponding transceiver systems 125, 135. Similarly, receiver 140 receives information items transmitted by transmitting system 145. The communication protocols between wireless systems, e.g., 120,125, may use conventional wireless protocols associated with Bluetooth, cellular, LAN, or similar protocols.

Figure 2:
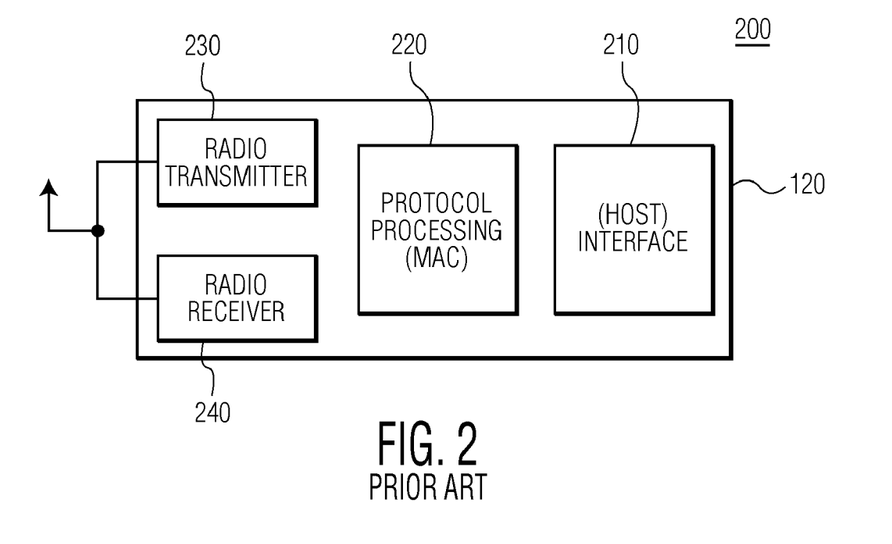
FIG. 2 illustrates a block diagram of a conventional wireless communication sub-system.

FIG. 2 illustrates a block diagram of a conventional wireless communication sub-system 200, e.g., transceiver A 120 in FIG. 1. In this exemplary block diagram, host interface 210 provides communication interface between an application software (FIG. 1) and protocol processing 220. In this illustrative case, protocol processing 220 transforms and packages information items received from interface 210 into a format in accordance with a specified protocol. Similarly, information items received through the wireless communication media are re-packaged into a format suitable for interpretation by application software (FIG. 1).

Also shown are radio transmitter 230 and radio receiver 240 for transmitting and receiving information to/from the wireless network. In most conventional systems, transmitter 230 and receiver 240 are packaged into a single package and are commonly referred to as a transceiver, e.g., transceiver 120.

Figure 3:
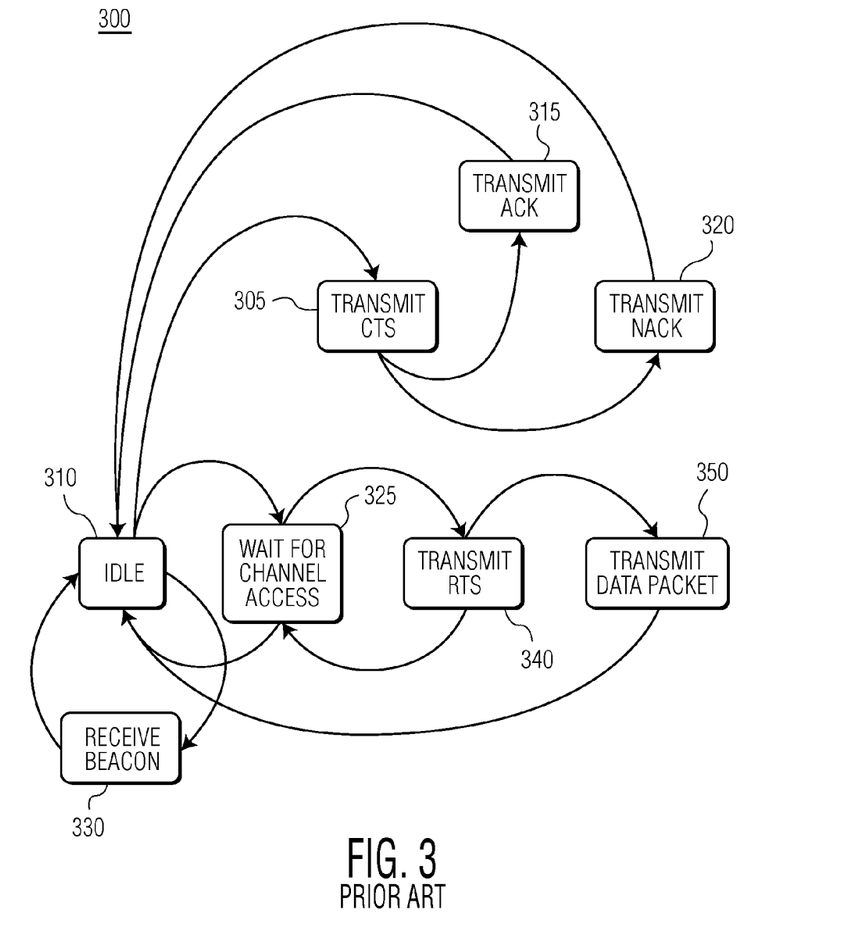
FIG. 3 illustrates a conventional state machine for conventional wireless communication processing.

FIG. 3 illustrates a conventional state machine 300 for conventional wireless communication processing. In this exemplary state machine 300, a protocol nominally resides in idle state 310 until a request, action,. or operation is detected. In response to the request, action, or operation,. processing may proceed to Transmit CTS state 305, Transmit ACK state 315. Transmit NACK state 320, Wait Channel Access state 325, or Receive Beacon state 330. Each of these states then waits for an appropriate request, action, or operation to proceed to the next state. For example, in response to an appropriate request, the Wait Channel Access state 325 proceeds to Transmit RTS state 340, and, in response to an appropriate command, the Transmit RTS state 340 proceeds to the Transmit Data Packet state 350. The operation of each of these states is well-known in the art and need not be discussed in detail herein.

In response to a request, a determination is made, at step 640, whether any receive and/or transmit requests have been received. If receive requests are determined, then the receive requests are granted at block 660. However, if transmit requests are determined at step 642, then a determination is made with regard to the cost to grant the transmit requests at step 644.

At step 646, a determination is made whether any transmit requests are to be processed. If the answer is negative, then processing continues at step 648. However, if the answer is affirmative, then the transmit request with the lowest cost is selected at step 650. In one aspect of the invention, when two requests are determined to have the same lowest cost, the selected request may be determined randomly.

Figure 4A:
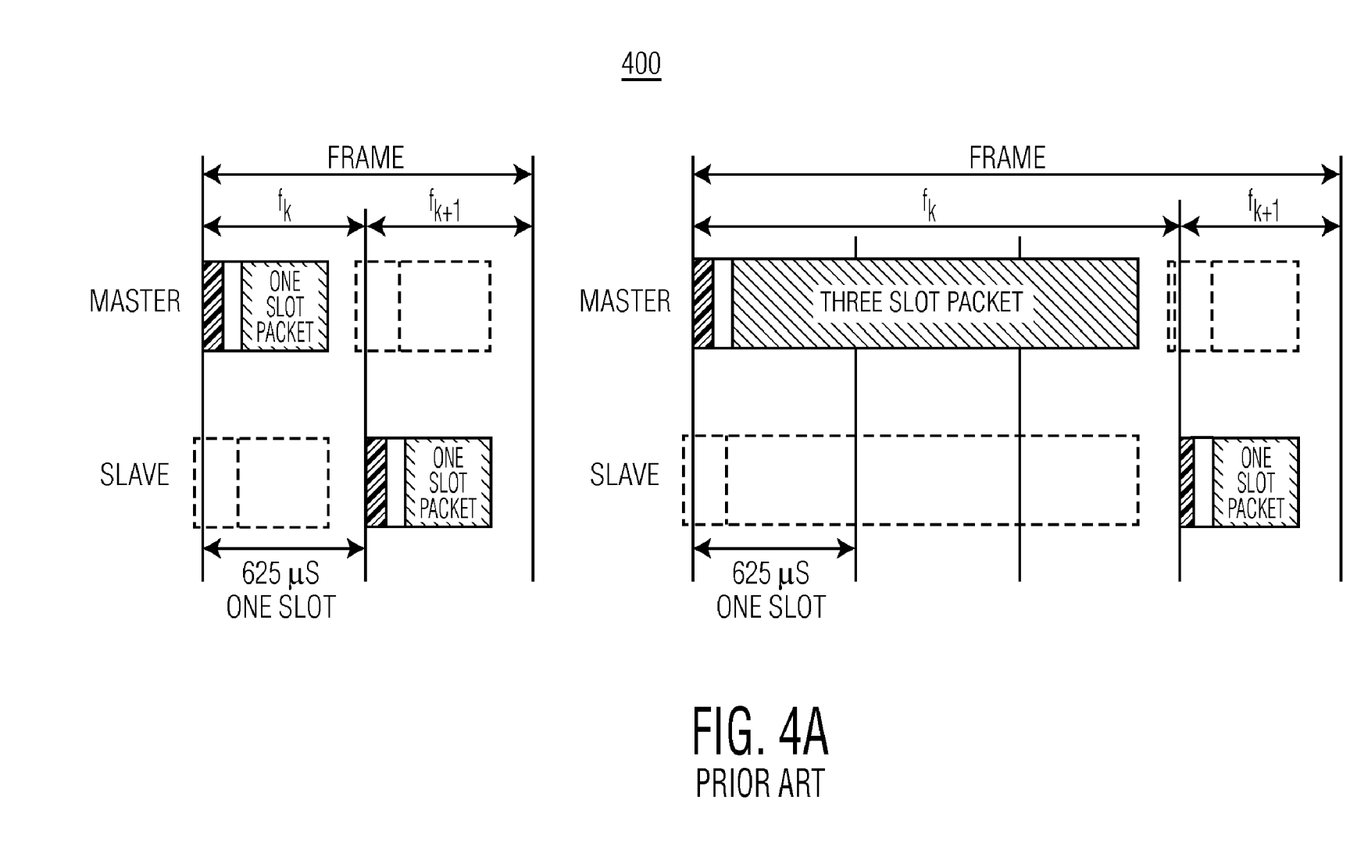
FIGS. 4a-4d illustrate conventional wireless communication sub-system protocols.
Figure 4B:
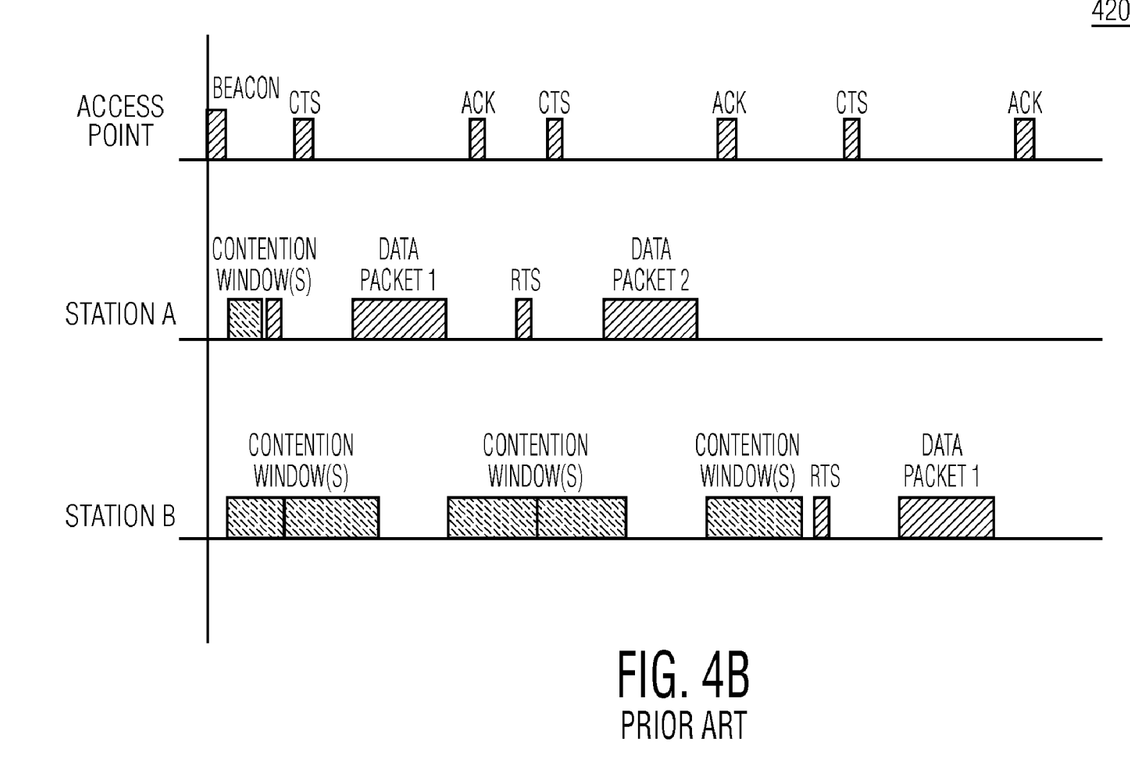
Figure 4C:
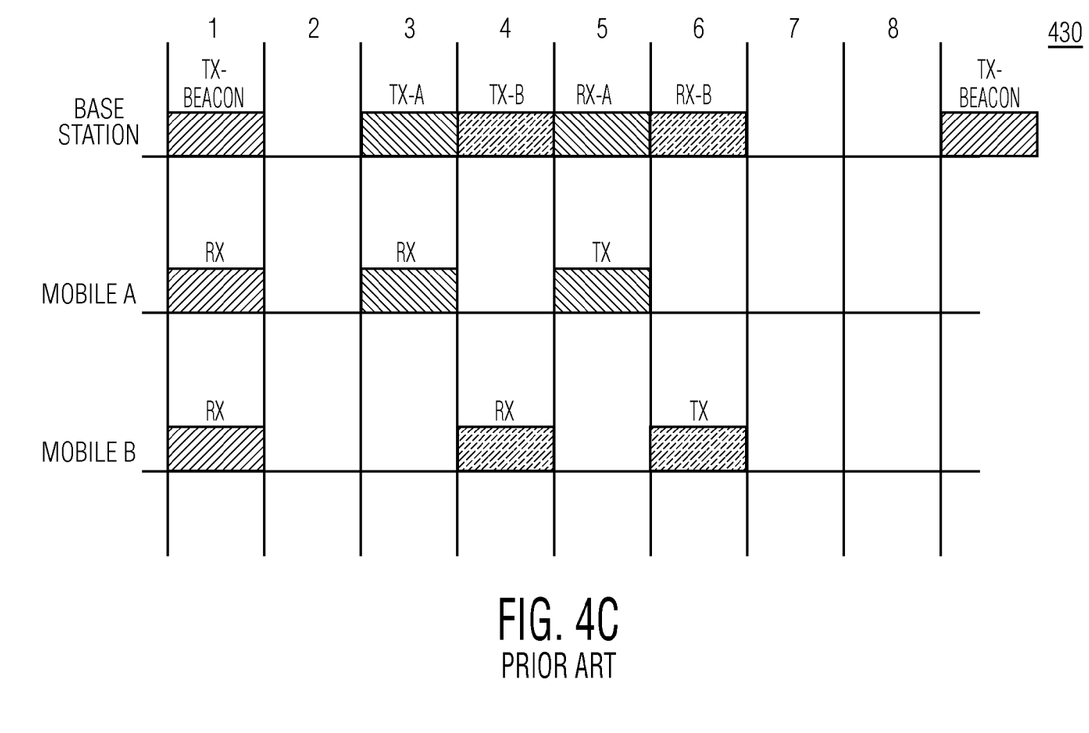
Figure 4D:
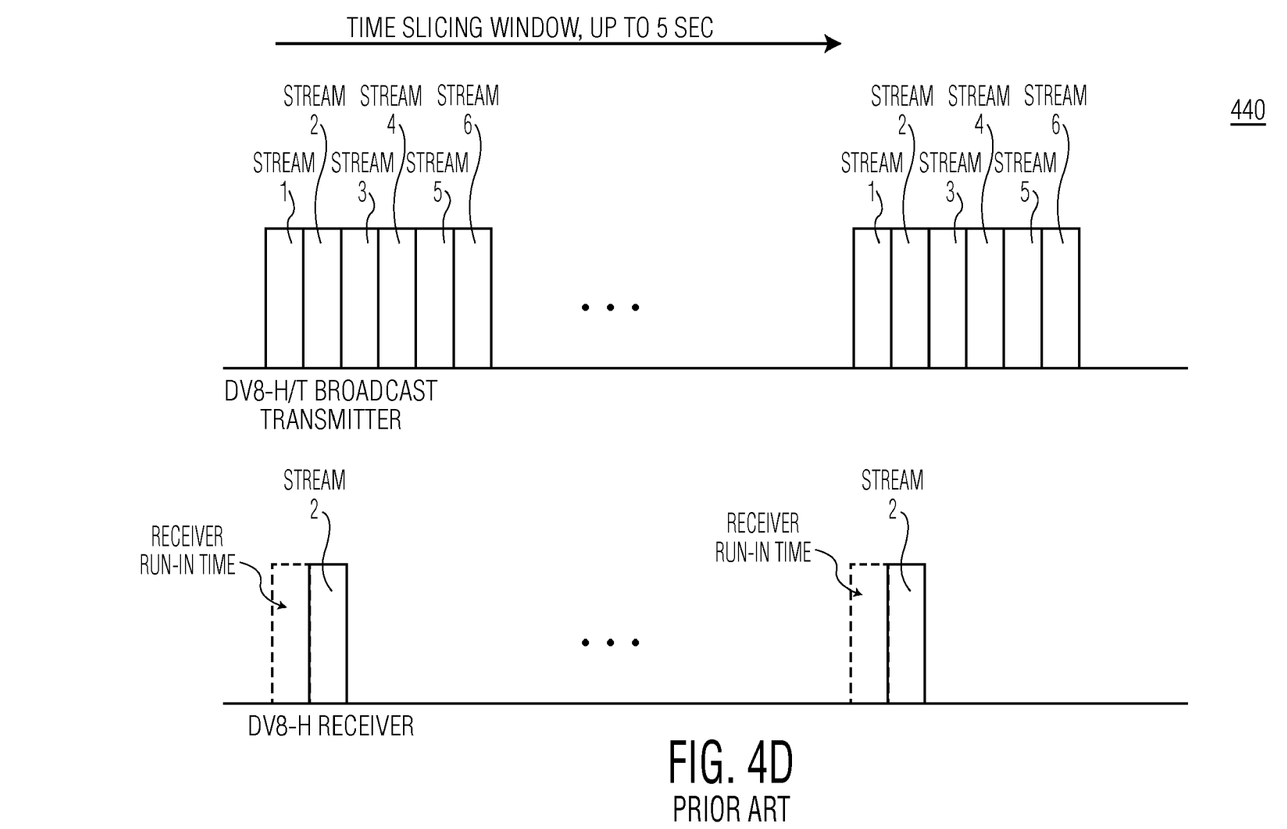

FIGS. 4a-4d illustrate conventional wireless communication sub-system protocols. FIG. 4a illustrates a conventional Bluetooth communication protocol 400. FIG. 4b illustrates a conventional IEEE 802.11 protocol 420. FIG. 4c illustrates a conventional GSM protocol 430 and FIG. 4d illustrates a conventional Digital Video Broadcast (DVB-H) communication protocol 440. Each of these protocols is well-known in the art and need not be discussed in detail herein. As FIGS. 4a-4d illustrate, each protocol, operating independently, can induce significant interference when one or more systems are transmitting while others are receiving.

Figure 5A:
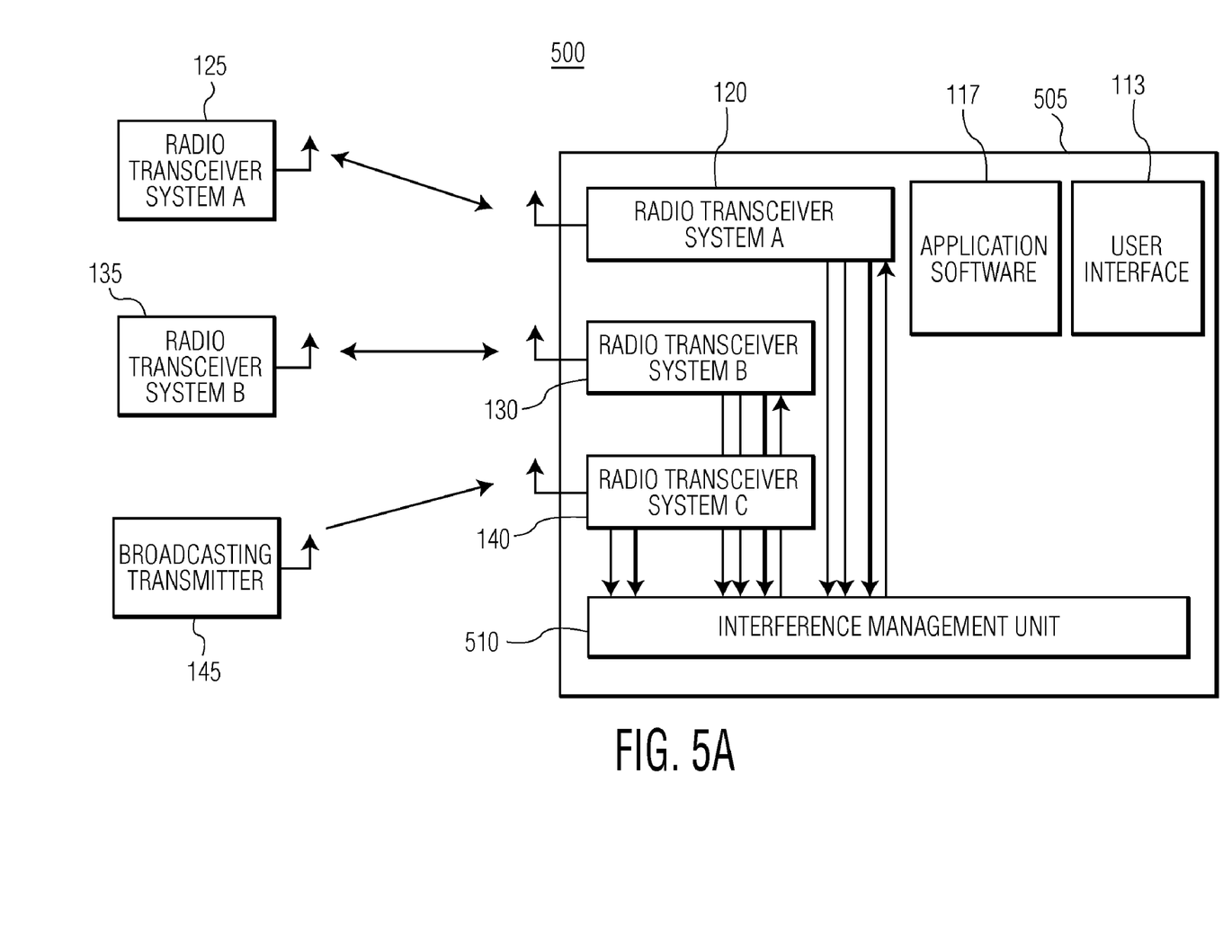
FIG. 5a illustrates a block diagram of a multi-wireless communication sub-system in accordance with the principles of the invention.

FIG. 5a illustrates a block diagram 500 of a multi-wireless communication sub-system 505 in accordance with the principles of the invention. Sub-system 505 is similar to that shown in FIG. 1 and includes interference management unit (IMU) 510 in communication with each of the transceivers 120, 130 and receiver 140 (FIG. 1). IMU 510 provides an "approval to transmit" message to each transceiver to synchronize their transmission to minimize interference between the sub-systems. More specifically, IMU 510 receives "transmit" and "receive" requests and state information from each of the systems 120, 130, 140 and determines which transmit request to grant. Only one request to transmit is granted at any time in order to minimize interference caused by multiple transmitters being active at the same time.

Figure 5B:
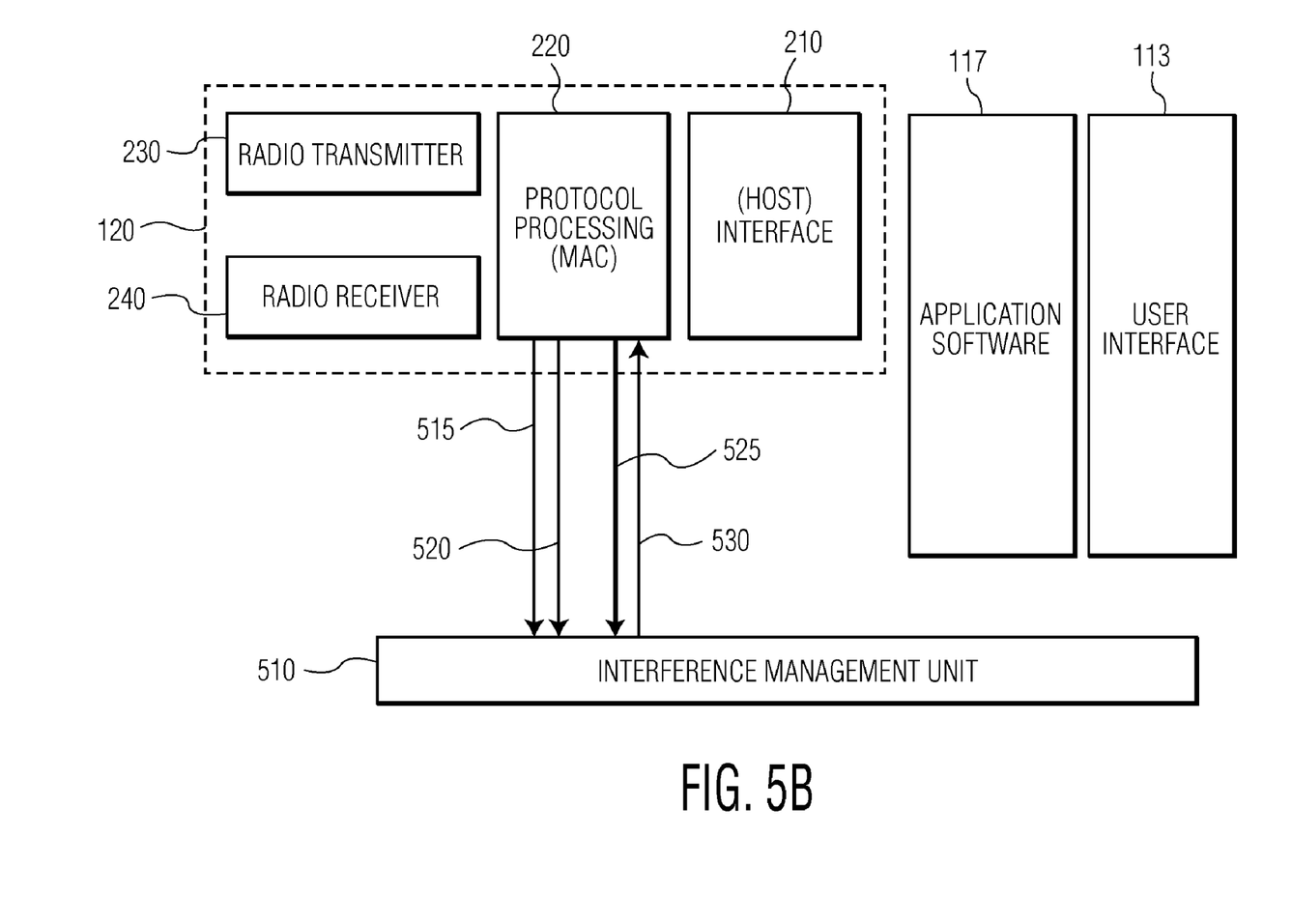
FIG. 5b illustrates an exemplary processing sequence in accordance with the principles of the invention.

FIG. 5b illustrates in further detail the communication between a specific transceiver and IMU 510 shown in FIG. 5a. More specifically, "request to receive" 515, "request to transmit" 520 and "protocol processing state information" 525 (FIG. 3) are provided to IMU 510 and "approval to transmit" 530 is provided to the respective transceiver or transmitter.

In one aspect of the invention, IMU 510 utilizes a "minimum cost" algorithm to determine to which of the transceivers, e.g., 120, 130, 140, to grant "approval to transmit."

Figure 6A:
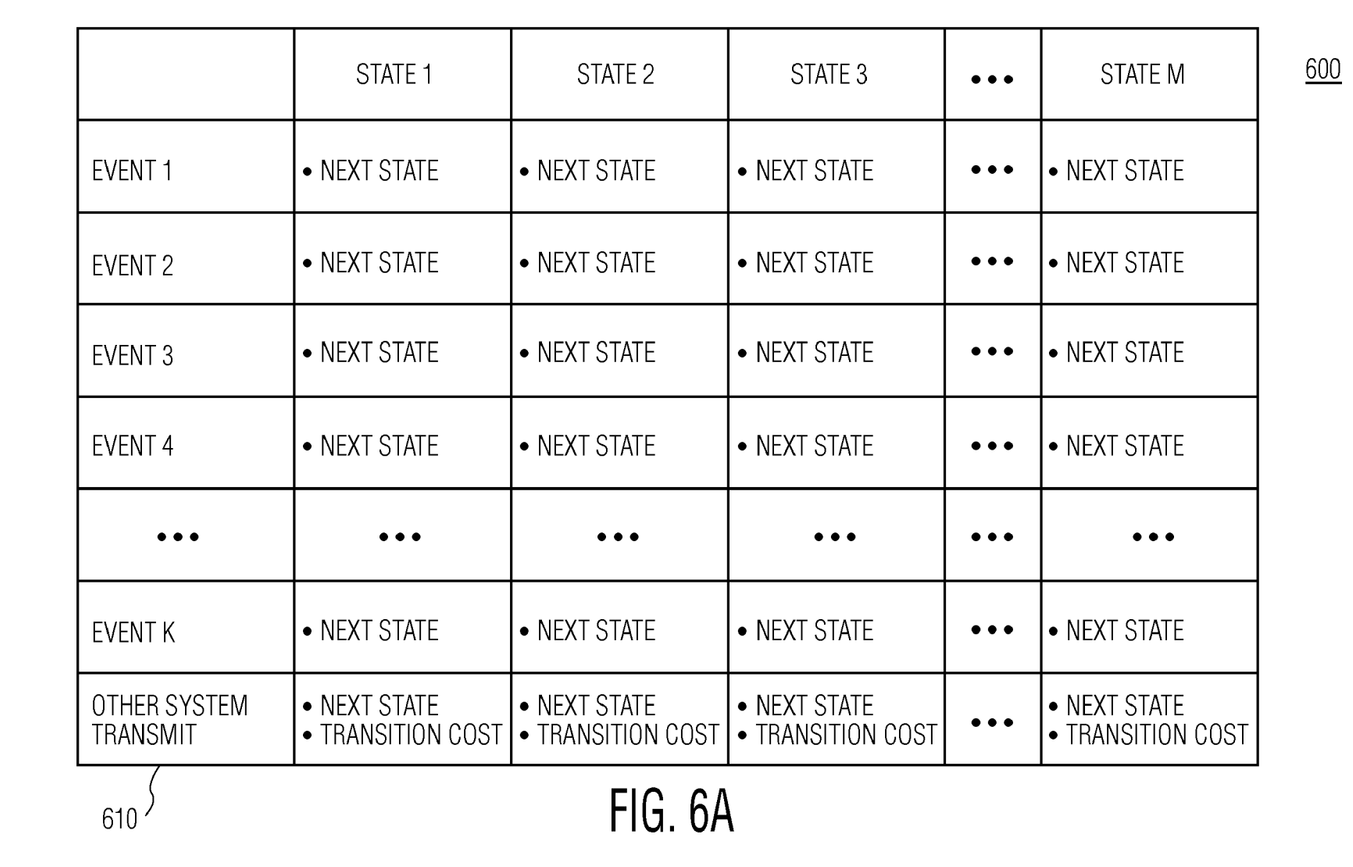
FIG. 6a-6c illustrate exemplary processing for determining a grant to transmit in accordance with the principles of the invention.
Figure 6B:
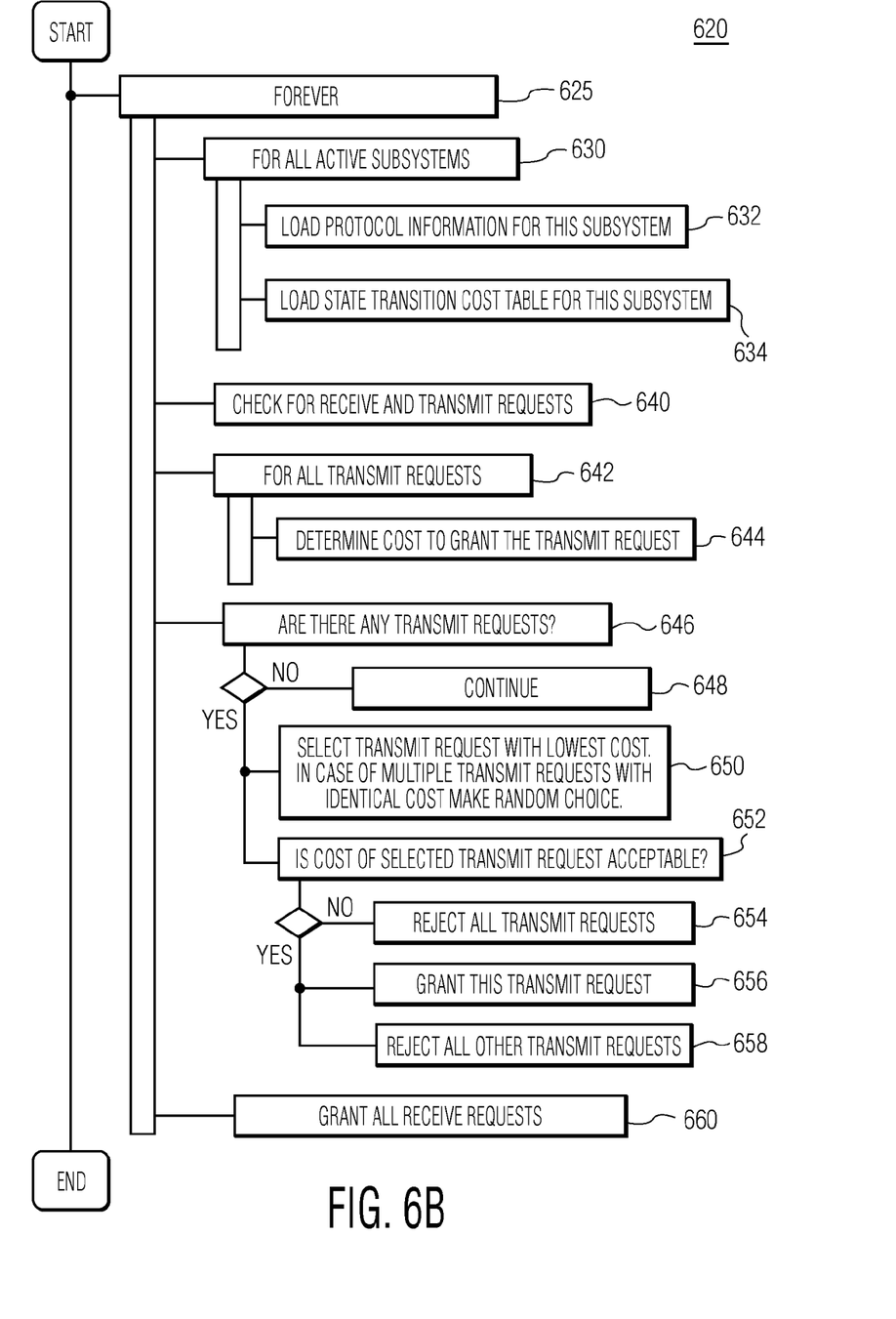
Figure 6C:
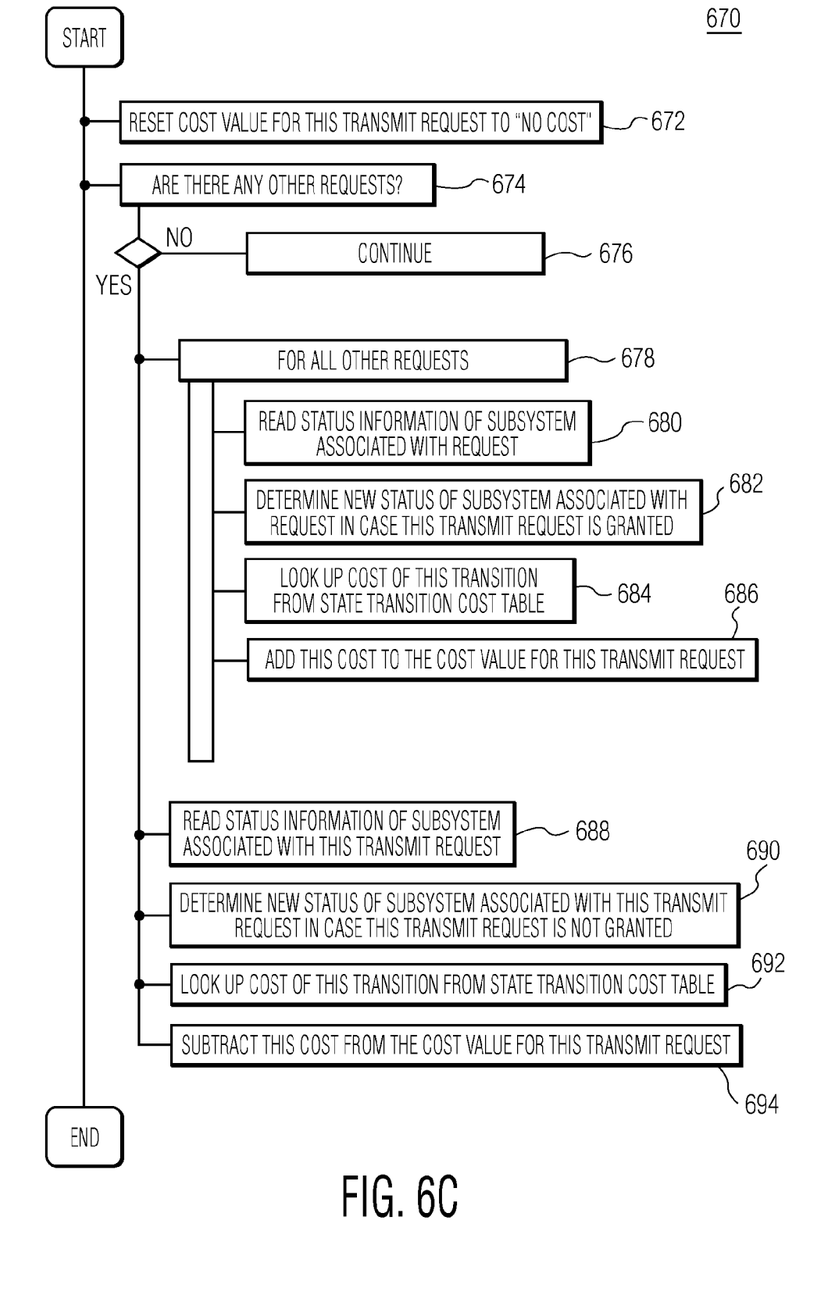

FIGS. 6a-6c illustrate exemplary processing for determining the cost associated with each possible decision to grant "receive" and "transmit" requests in accordance with the principles of the invention. (FIG. 6a illustrates a state transition cost table 600, which is formulated for each of the wireless standards to be supported by the system 500. In this illustrated example, the header row of the table lists all the states defined within the specific wireless standard. These are the same states as shown in the example in FIG. 3. As this table is representative of a plurality of wireless standards, the labels are merely referred to as State 1, State 2, etc. It would be in the knowledge of those skilled in the art to incorporate the states associated with specific wireless standards. Similarly, the first column shows all possible events for the respective wireless standard. Thus, table 600 teaches that for each state in a wireless system the next state is defined that is entered when a corresponding event occurs.

In accordance with the principles of the invention, a new event 610 is added to the original state/event table. This event defines the state that shall be entered when none of the defined events happens, but the right to transmit is granted to one of the other systems. The elements of this new event 610 do not only show the next state to assume based on the event "other system gets the right to transmit." In another aspect of the invention, this new event may be associated with the cost of this unintentional transition in terms of the initial state/event table. This cost may be associated with loss of data or an extra level of effort needed to return to the initial state. In some cases, it is possible that no cost is associated with the event "other system gets the right to transmit," as the system is neither receiving nor transmitting. In such a case the cost entry would simply be "no cost."

The cost associated with each of the additional transitions needs to be derived from the level of impact that the event "other system gets the right to transmit" will have on the current wireless system.

FIG. 6b illustrates a flow chart 620 of an exemplary process for determining which receiver to grant a request to transmit in accordance with the principles of the invention. As is shown, the process nominally remains in state 625 waiting for the reception of operational commands or requests. In response to an initialization command, for example, the protocol and state transition cost tables are loaded at steps 632 and 634, respectively, for all active sub-systems as represented by step 630.

In response to a request, a determination is made, at step 640, whether any receive and/or transmit requests have been received. If receive requests are determined, then the receive requests are granted at block 660. However, if transmit requests are determined at step 642, then a determination is made with regard to the cost to grant the transmit requests at step 644.

At step 646, a determination is made whether any transmit requests are to be processed. If the answer is negative, then processing continues at step 648. However, if the answer is affirmative, then the transmit request with the lowest cost is selected at step 650. In one aspect of the invention, when two requests are determined to have the same lowest cost, the selected request may be determined randomly.

At step 652, a determination is made whether the cost of the selected transmit request is acceptable. If the answer is negative, then all transmit requests are rejected at step 654. However, if the answer is affirmative, then the transmit request is granted at step 656 and all other transmit requests are rejected at step 658.

FIG. 6c illustrates an exemplary process 670 for determining the cost to grant transmit requests in accordance with the principles of the invention. In this exemplary process, the cost of each transmit request is initialized to a known state, e.g., "no cost," at step 672. At step 674, a determination is made whether any other concurrent requests are available besides the current transmit request under evaluation. If the answer is affirmative, at step 676, then for all requests, as represented at step 678, the status information of the system associated with the request is read at step 680. A new status of the system associated with the request is determined, at step 682, in case the request is granted. This may involve the state transition cost table 600. The cost of the transition is then determined at step 684. In one aspect, the cost is obtained from a predetermined list or table of cost values. The obtained cost is added to the cost value associated with the transmit request.

At step 688, the status information of the transmit request is read and a new status of the system associated with the request is determined in case the transmit request is not granted, at step 690. This may involve the state transition cost table 600. This cost similarly may be obtained from a predetermined list or table of cost values at step 692. This cost is then deducted from the cost value associated with the transmit request at step 694.

In another aspect of the invention, the determination of the cost of granting a request may further consider cost tables associated with each of the requesting wireless sub-systems. In this case, the cost to grant a request would be dependent upon not only the effect on the current wireless system but also on the other systems submitting a request to transmit. In this manner, a priority scheme can be implemented between the wireless sub-systems contained within the device.

Figure 7:
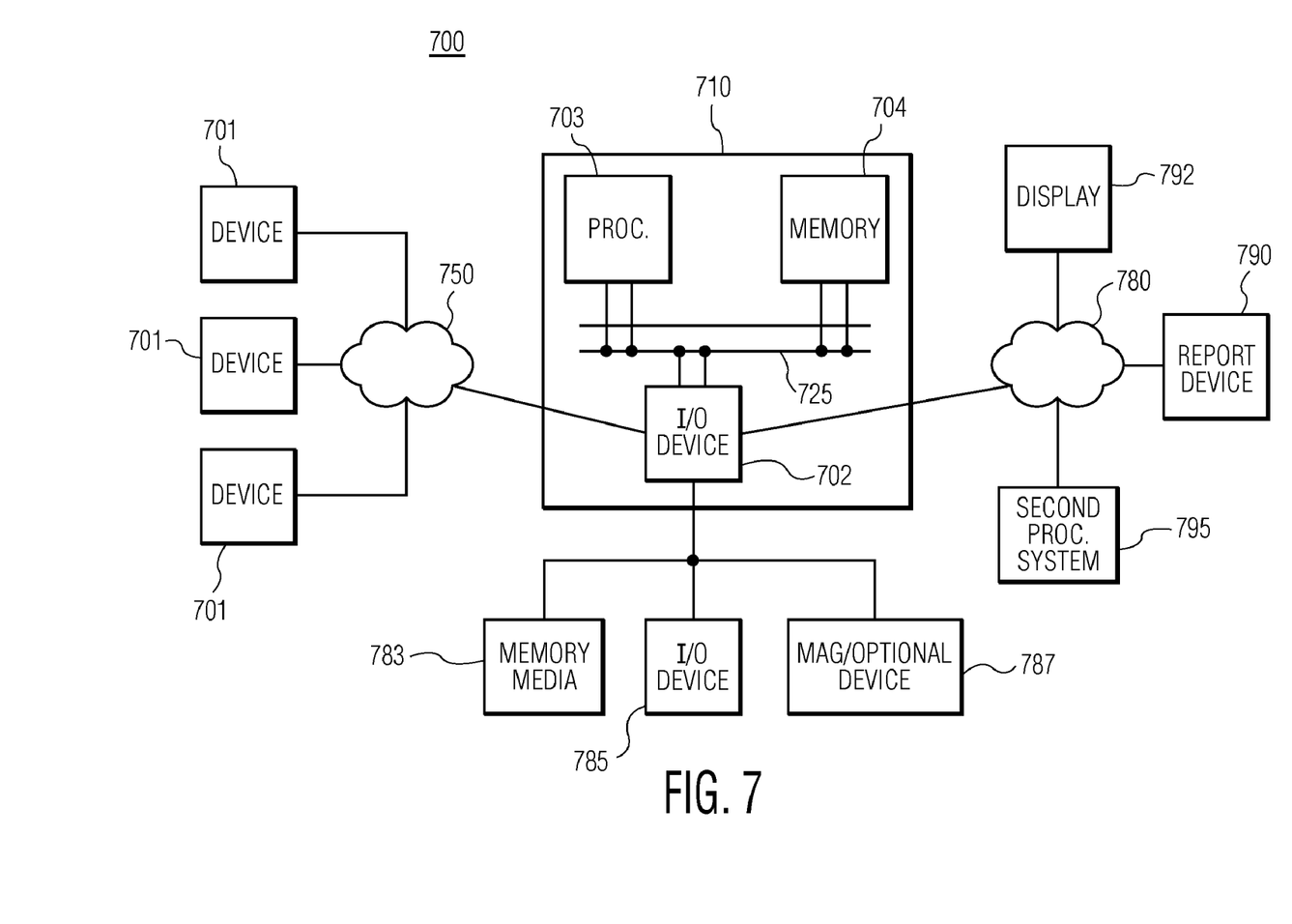
FIG. 7 illustrates an exemplary apparatus for executing the processing shown herein.

FIG. 7 illustrates an exemplary apparatus for executing the processing shown herein. FIG. 7 illustrates an exemplary embodiment of a system or apparatus 700 that may be used for implementing the principles of the present invention. System 700 includes processing unit 710 that may contain one or more input/output devices 702, processors 703 and memories 704. I/O devices 702 may access or receive information from one or more sources or devices 701. Sources or devices 701 may be devices such as the transceivers shown.

Input/output devices 702, processors 703 and memories 704 may communicate over a communication medium 725. Communication medium 725 may represent, for example, a bus, a communication network, one or more internal connections of a circuit, circuit card or other apparatus, as well as portions and combinations of these and other communication media. Input data from the devices 701 is processed in accordance with one or more programs that may be stored in memories 704 and executed by processors 703. Memory 704 may be selected preferably from semiconductor memories such as a Read-Only Memory (ROM), a Programmable ROM, a Random Access Memory, which is accessible through medium 725 or may be a cache memory in direct communication with processors 703. Processors 703 may be any means, such as a general-purpose or special-purpose computing system, such as a laptop computer, desktop computer, a server, handheld computer, or they may be a hardware configuration, such as a dedicated logic circuit, or integrated circuit. Processors 703 may also be Programmable Array Logic (PAL), or Application Specific Integrated Circuit (ASIC), etc., which may be "programmed" to include software instructions or a code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing a hardware executable code.

In one aspect, the processes shown herein may be represented by a computer-readable code stored on a computer-readable medium. The code may also be stored in the memory 704. The code may be read/downloaded from a memory medium 783, an I/O device 785 or magnetic or optical media, such as a floppy disk, a CD-ROM or a DVD, 787. The downloaded computer-readable code may be stored in memory 704 or executed directly by processor 703.

Information from device 701 received by I/O device 702, after processing in accordance with one or more software programs operable to perform the functions illustrated herein, may also be transmitted over network 780 to one or more output devices represented as display 792, reporting device 790, e.g., printer, or second processing system 795. Network 780 may be physically the same as network 750 or may be a different network that operates on the same or different communication principles as that of network 750.

While there has been shown, described, and noted fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

Accordingly, it is expressly intended that all combinations of those elements that perform substantially the same function in substantially the same way to achieve the same results are within the scope of the invention. Substitutions of elements from one described embodiment to another are also fully intended and contemplated.

The invention claimed is:

1. A method for managing transmit requests from a plurality of co-located devices, each of the devices associated with at least one wireless communication protocol having a plurality of states, said method comprising:
   receiving a transmit request from a first device seeking to transmit;
   determining a cost to transition to a next state for each wireless communication protocol using a state transition cost table, wherein the next state transition is associated with the received transmit request;
   comparing the cost for each wireless communication protocol;
   determining the wireless communication protocol having the lowest cost;
   granting said transmit request if the first device is associated with the wireless communication protocol having the lowest cost; and
   rejecting said transmit request if the first device is not associated with the wireless communication protocol having the lowest cost.

2. The method as recited in claim 1, further comprising:
   determining whether the lowest cost is acceptable; and
   rejecting said transmit request associated with said lowest cost, when said lowest cost is unacceptable.

3. The method as recited in claim 1, wherein said cost to transition to the next state is predetermined.

4. An apparatus for managing transmit requests from a plurality of co-located devices, each of the devices associated with at least one wireless communication protocol having a plurality of states, said apparatus comprising:
   a processor in communication with a memory, said processor for executing code for:
   receiving a transmit request from a first device seeking to transmit;
   determining a cost to transition to a next state for each wireless communication protocol using a state transition cost table, wherein the next state transition is associated with the received transmit request;
   comparing the cost for each wireless communication protocol;
   determining the wireless communication protocol having the lowest cost;
   granting said transmit request if the first device is associated with the wireless communication protocol having the lowest cost; and
   rejecting said transmit request if the first device is not associated with the wireless communication protocol having the lowest cost.

5. The apparatus as recited in claim 4, the processor further executing a code for:
   determining whether the lowest cost is acceptable; and
   rejecting said transmit request associated with said lowest cost, when said lowest cost is unacceptable.

6. The apparatus as recited in claim 4, wherein said cost to transition to the next state is predetermined.

7. The apparatus as recited in claim 4, further comprising:
   an input/output device for providing information items to the processor.

8. The apparatus as recited in claim 4, wherein said code is stored in said memory.

9. A method for managing transmit requests from a plurality of co-located devices, the method comprising:

associating a first wireless communication protocol with a first device, wherein the first wireless communication protocol includes a first plurality of states;

associating a second wireless communication protocol with a second device, wherein the second wireless communication protocol includes a second plurality of states;

determining a first plurality of state transitions for the first wireless communication protocol associated with a first plurality of events occurring in the first device and the second device, wherein at least one event of the first plurality of events is the transmit request;

determining a second plurality of state transitions for the second wireless communication protocol associated with a second plurality of events occurring in the first device and the second device, wherein at least one event of the second plurality of events is the transmit request;

determining a first plurality of costs associated with each of the first plurality of states and the transmit request;

determining a second plurality of costs associated with each of the second plurality of states and the transmit request; and upon the transmit request from at least one of the first device and the second device:

determining a current state of the first wireless communication protocol;

determining a current state of the second wireless communication protocol;

determining a first cost from a first plurality of costs associated with the current state of the first wireless communication protocol using a state transition cost table;

determining a second cost from a second plurality of costs associated with the current state of the second wireless communication protocol using the state transition cost table;

comparing the first cost and the second cost; and granting the request to transmit if the device requesting to transmit has the lower of the two costs.

10. The method as recited in claim 1, wherein the cost for each wireless communication protocol is associated with a level of effort needed to transition to an initial state of each wireless communication protocol.

11. The apparatus as recited in claim 4, wherein the cost for each wireless communication protocol is associated with a level of effort needed to transition to an initial state of each wireless communication protocol.

12. The method as recited in claim 9, wherein the first cost is associated with a level of effort needed to transition to an initial state of the first wireless communication protocol, and the second cost is associated with a level of effort needed to transition to an initial state of the second wireless communication protocol.

13. The method of claim 1, wherein the state transition cost table comprises all possible state transition events for each wireless communication protocol.

14. The apparatus of claim 4, wherein the state transition cost table comprises all possible state transition events for each wireless communication protocol.

15. The method of claim 9, wherein the state transition cost table comprises all possible state transition events for each wireless communication protocol.

16. The method of claim 1, wherein the state transition cost table associates a cost of each state transition event with a level of impact.

17. The apparatus of claim 4, wherein the state transition cost table associates a cost of each state transition event with a level of impact.

18. The method of claim 9, wherein the state transition cost table associates a cost of each state transition event with a level of impact.

19. The method of claim 1, further comprising:
updating the state transition cost table after granting a right to transmit between two of the plurality of co-located devices based upon a previously undefined state transition event.

20. The method of claim 9, further comprising:
updating the state transition cost table after granting a right to transmit between two of the plurality of co-located devices based upon a previously undefined state transition event.

* * * * *